US009961494B2

(12) United States Patent  
Kannan

(10) Patent No.: US 9,961,494 B2  
(45) Date of Patent: May 1, 2018

(54) SHARING CONTENT WITH NEARBY DEVICES

(75) Inventor: Akshay Kannan, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 169 days.

(21) Appl. No.: 13/585,748

(22) Filed: Aug. 14, 2012

(65) Prior Publication Data

US 2014/0053078 A1    Feb. 20, 2014

(51) Int. Cl.
| | |
|---|---|
| G06F 3/00 | (2006.01) |
| H04W 4/02 | (2018.01) |
| H04W 4/20 | (2018.01) |
| H04L 29/08 | (2006.01) |
| H04L 29/06 | (2006.01) |
| G06F 3/0481 | (2013.01) |
| G06Q 10/10 | (2012.01) |
| H04W 4/18 | (2009.01) |

(52) U.S. Cl.
CPC ........... *H04W 4/023* (2013.01); *H04W 4/206* (2013.01); *G06F 3/0481* (2013.01); *G06Q 10/107* (2013.01); *H04L 29/06* (2013.01); *H04L 29/06034* (2013.01); *H04L 29/08072* (2013.01); *H04L 67/10* (2013.01); *H04W 4/18* (2013.01)

(58) Field of Classification Search
USPC ................................ 715/748, 862, 863, 864
See application file for complete search history.

(56) References Cited

U.S. PATENT DOCUMENTS

| 7,783,702 B2 | 8/2010 | Liu et al. |
| 2002/0003548 A1* | 1/2002 | Krusche et al. ............. 345/736 |
| 2004/0044774 A1 | 3/2004 | Mangalik et al. |

(Continued)

FOREIGN PATENT DOCUMENTS

| EP | 2387202 A1 | 11/2011 |
| KR | 10-2008-007230 | 8/2008 |
| KR | 10-2008-0093313 | 10/2008 |

OTHER PUBLICATIONS

Hyunjeong Lee et al., Content Sharing mechnism witth multiple devices in real-time multimedia service environment, Sep. 29, 2011, IEEE Conference Publication.*

(Continued)

*Primary Examiner* — Tam Tran
(74) *Attorney, Agent, or Firm* — Brake Hughes Bellermann LLP

(57) ABSTRACT

Various aspects of the subject technology relate to systems, methods, and machine-readable media for sharing content with a nearby device. A system is configured receive, from a sending device, a request to share content, wherein the request comprises location information associated with a location of the sending device and content characteristics, determine, based on the location information and the content characteristics, that one or more receiving devices are within a proximity threshold of the location of the sending device and are capable of loading content associated with the content characteristics, receive, from the sending device, a selection of a receiving device from the one or more receiving devices and content to be shared, and provide the content to be shared to the selected receiving device.

20 Claims, 6 Drawing Sheets

(56) References Cited

U.S. PATENT DOCUMENTS

| | | | |
|---|---|---|---|
| 2004/0236850 A1* | 11/2004 | Krumm | H04L 29/06 709/224 |
| 2004/0266348 A1* | 12/2004 | Deshpande et al. | 455/41.2 |
| 2006/0031489 A1 | 2/2006 | Marcjan | |
| 2008/0148330 A1 | 6/2008 | Liwerant et al. | |
| 2008/0189294 A1 | 8/2008 | Cha | |
| 2008/0256175 A1 | 10/2008 | Lee et al. | |
| 2010/0083338 A1 | 4/2010 | Chiang | |
| 2010/0094996 A1 | 4/2010 | Samaha | |
| 2010/0131979 A1 | 5/2010 | Sievert et al. | |
| 2010/0257251 A1 | 10/2010 | Mooring et al. | |
| 2010/0299308 A1 | 11/2010 | Prasad et al. | |
| 2011/0083111 A1* | 4/2011 | Forutanpour et al. | 715/863 |
| 2011/0092222 A1* | 4/2011 | Kuo et al. | 455/456.1 |
| 2011/0131332 A1* | 6/2011 | Bouazizi | H04L 65/1093 709/227 |
| 2011/0173337 A1 | 7/2011 | Walsh et al. | |
| 2011/0194141 A1 | 8/2011 | Sweet et al. | |
| 2012/0060100 A1* | 3/2012 | Sherwood | H04N 21/4122 715/748 |
| 2012/0162538 A1* | 6/2012 | Dixon | H04L 12/2814 348/734 |
| 2013/0125212 A1* | 5/2013 | Lee | H04N 21/4122 726/4 |

OTHER PUBLICATIONS

Bo Xing et al., Proximiter: Enabling mobile proximity-based content sharing on portable devices, May 8, 2009, IEEE.*

* cited by examiner

100

SHARING CONTENT WITH NEARBY DEVICES

BACKGROUND

The present disclosure generally relates to sharing content between devices.

Computing devices in a local area network (LAN) may be configured to share content with one another. Content may include video content, audio content, documents, or images. In order to share content, a receiving device that is to receive the content to be shared may need to configure one or more settings on the receiving device that enable sending devices on the LAN to access a folder on the receiving device. A sending device may then find the receiving device on the LAN and transmit the content to the receiving device.

In order to load the content on the receiving device, however, the sending device may need to configure one or more settings to share the content with other devices on the LAN. A user on the receiving device may then locate the sending device, locate the content to be shared, and load the content.

SUMMARY

Various aspects of the subject technology relate to a system for sharing content with a nearby device. The system may include one or more processors and a machine-readable medium comprising instructions stored therein, which when executed by the one or more processors, cause the one or more processors to perform operations. The operations may include receiving, from a sending device, a request to share content, wherein the request comprises location information associated with a location of the sending device and content characteristics, identifying one or more receiving devices based on the location information and the content characteristics, wherein the one or more identified receiving devices are within a proximity threshold of the location of the sending device, and wherein the one or more identified receiving devices are capable of loading content associated with the content characteristics, receiving, from the sending device, a selection of a receiving device from the one or more identified receiving devices and content to be shared, and transmitting the content to be shared to the selected receiving device.

Other aspects of the subject technology relate to a method for sharing content with a nearby device. The method may include receiving, from a sending device, a request to share content, wherein the request comprises location information associated with a location of the sending device and content characteristics, determining, based on the location information and the content characteristics, that one or more receiving devices are within a proximity threshold of the location of the sending device and are capable of loading content associated with the content characteristics, receiving, from the sending device, a selection of a receiving device from the one or more receiving devices and content to be shared, and providing the content to be shared to the selected receiving device.

Various aspects of the subject technology relate to a non-transitory machine-readable medium comprising instructions stored therein, which when executed by a machine, cause the machine to perform operations for sharing content with nearby devices. The operations may include receiving, from a sending device, a request to share content, wherein the request comprises location information associated with a location of the sending device and content characteristics, determining, based on the location information and the content characteristics, that one or more candidate receiving devices are within a proximity threshold of the location of the sending device and are capable of loading content associated with the content characteristics, receiving, from the sending device, a selection of a receiving device from the one or more candidate receiving devices and content to be shared, and providing the content to be shared to the selected receiving device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

In many cases, sharing content between a sending device and a receiving device may be limited to simply transferring the content to the receiving device. In order to load, on the receiving device, content stored on the sending device (e.g., view the pictures, play the audio or video file, or print a document), a user must use the receiving device to locate the content on the sending device and load the content. Furthermore, difficulties may arise in sharing content between computing devices that are not on the same sub-network (e.g., are not connected to the same LAN). For example, it may be difficult to detect devices on different networks and, even if computing devices are detected, the devices may not be configured to load the certain types of content (e.g., a device may not have the appropriate capabilities or software to load the content).

Various aspects of the subject technology relate to systems and methods for sharing content with nearby computing devices. According to one aspect, a user on a sending device is able to select content to share with a receiving device. In response to the selection of content to be shared, a system may be configured to identify receiving devices that are capable of loading the content to be shared and that are close in proximity to the sending device, regardless of the LAN that the receiving devices are connected to.

For example, a user in his living room may wish to play a video stored on the user's smart phone (the sending device), connected to a cellular network (e.g., a 3G network), on a nearby device (e.g., a display device such as a smart television) that is connected to a home Wi-Fi network. The user may select the desired video on the smart phone and, in response to the selection, the system may identify receiving devices that are capable of playing the video, such as the user's nearby laptop, a tablet, a nearby computer, and a smart television.

The available devices may be shown to the user so that the user can indicate which receiving device to play the video on. In response to the indication, the system receives the video from the user's smart phone (e.g., the sending device) on the cellular network and transmits the video to the display device (e.g., the receiving device) on the home Wi-Fi network. When the display device receives the video, the display device may automatically play the video.

Figure 1:
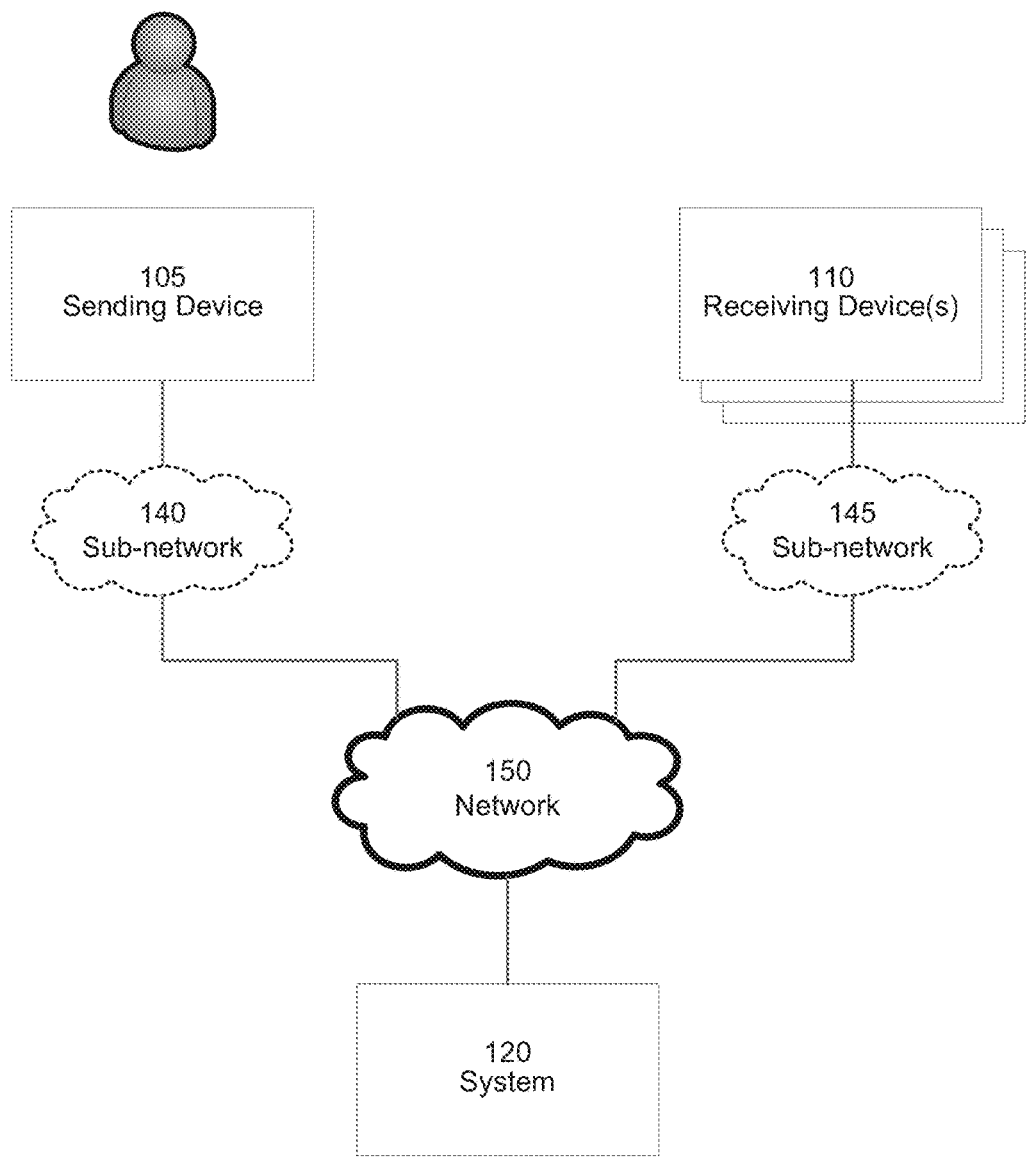
FIG. 1 is a block diagram illustrating an example network environment for sharing content with nearby devices, in accordance with various aspects of the subject technology.

FIG. 1 is a block diagram illustrating an example network environment 100 for sharing content with nearby devices, in accordance with various aspects of the subject technology. Although FIG. 1 illustrates a client-server network environment 100, other aspects of the subject technology may include other configurations including, for example, peer-to-peer environments.

The network environment may include one ore more sending devices 105 and one or more receiving devices 110. The sending devices 105 and receiving devices 110 may be any machine able to communicate with the other devices, systems, or servers. Sending devices 105 and receiving devices may include, for example, mobile devices (e.g., tablet computers, smart phones, or personal digital assistants), display devices (e.g., televisions or smart-monitors), audio devices (e.g., receivers, digital music players, or stereos), or any other computing devices (e.g., laptops, desktop computers, GPS devices, etc.). Furthermore, a sending device 105 in one scenario may, in another scenario, be a receiving device and vice versa. In other aspects however, some receiving devices may not be capable of sending content.

The sending device 105 may communicate with other devices and systems through a sub-network 140 (e.g., a cellular network, a LAN established through a router, a personal area network (PAN), a satellite network, etc.). Similarly, the receiving device 110 may also communicate with other devices and systems through a sub-network 145.

In some aspects, the sub-networks 140 an 145 may be different networks. In other aspects, however, the sending device 105 and receiving device 110 may be on the same sub-network and communicate with one another via the sub-network.

According to one aspect, the sub-networks 140 and 145 may each be in communication with a larger network 150 (e.g., a wide area network (WAN), a broadband network (BBN), the Internet, or a combination of different networks). The network 150 may enable the sending device 105 and the receiving device to communicate with the system 120, which may also communicate via another sub-network.

The system 120 may be implemented on one or more servers, each having a processor, a memory, and communications capabilities. The system 120 may be configured to facilitate the sharing of content from the sending device 105 to a nearby receiving device 110 that is capable of loading the content.

Figure 2:
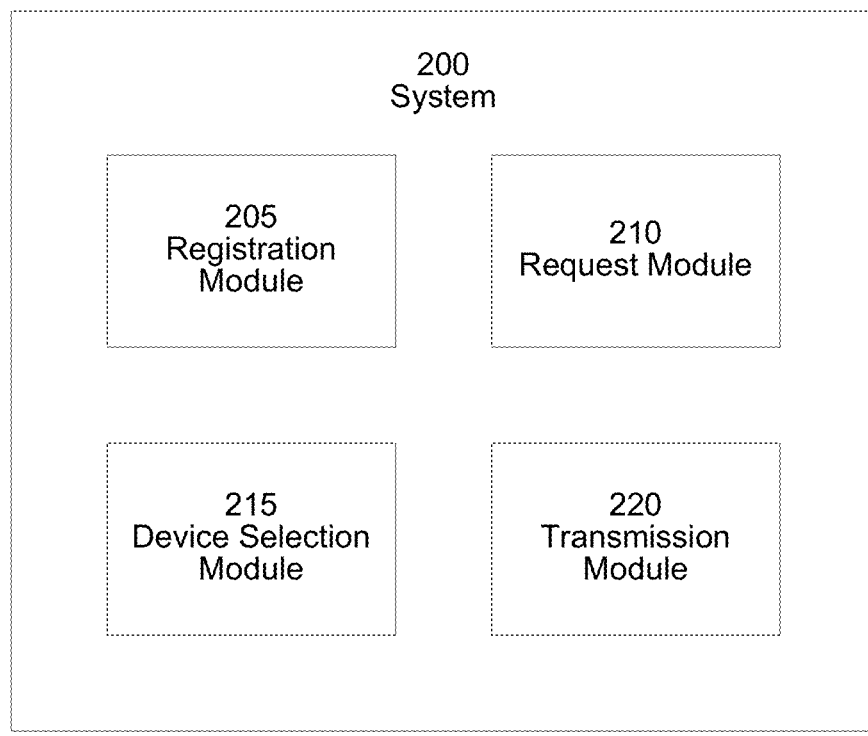
FIG. 2 is a block diagram illustrating an example system configured to enable a sending device to share content with a nearby receiving device, in accordance with various aspects of the subject technology.

For example, FIG. 2 is a block diagram illustrating an example system 200 configured to enable a sending device to share content with a nearby receiving device, in accordance with various aspects of the subject technology. The system 200 may include a registration module 205, a request module 210, a device selection module 215, and a transmission module 220. In other aspects, however, the system 200 may include additional modules, fewer modules, or different modules.

The registration module 205 may be configured to register one or more receiving devices 110. For example, the registration module 205 may receive a registration request from a receiving device 110 and, in response, create a record of the receiving device 110 that includes, for example, a name for the receiving device 110, the location information (e.g., location coordinates) for the receiving device, and content types (e.g., file formats) that the receiving device 110 is able to load or is giving authorization to the system 200 to load on the receiving device 110. In some aspects, the registration module can also register sending devices 105.

Location information, as discussed herein, may include, for example, a list of detected Wi-Fi networks, an Internet Protocol (IP) address, a global positioning system (GPS) signal, a list of detected cellular towers, a list of detected devices (e.g., using Bluetooth technology), a indication of the LAN currently connected to, or any other information that may be used to determine the location of a device.

The request module 210 may be configured to receive a request to share content from a sending device 105. The request generated by the sending device 105 may include location information for the sending device 105 and characteristics of the content the user wishes to share, such as the type of content or the side of the content file to be shared.

The request may be initiated by a sending device 105 when a user selects content such as file (e.g., a video file, a document, an audio file, etc). In some cases, the request is initiated by a particular gesture made by the user, with respect to the content, such as dragging a content file. An example of a user initiating a request is discussed further below with respect to FIG. 3A and FIG. 3B.

Figure 3A:
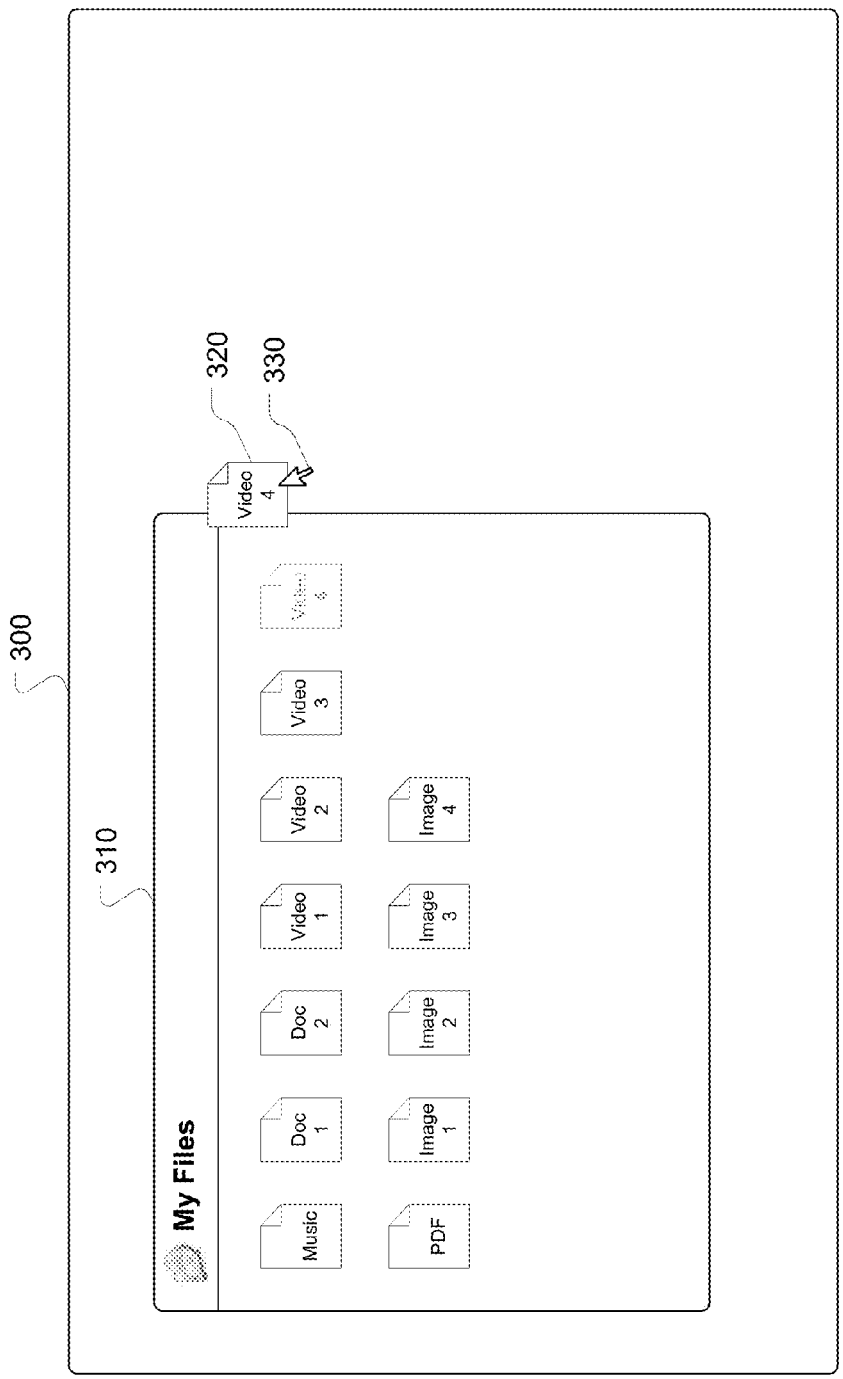
FIG. 3A illustrates an example user interface in which a user of a sending device may initiate a request to share content, in accordance with one aspect of the subject technology.

FIG. 3A illustrates an example user interface 300 in which a user of a sending device may initiate a request to share content, in accordance with one aspect of the subject technology. The user interface 300 is for a sending device such as a smart phone, a tablet, or a laptop. The user interface 300 may include an interface element 310, such as a window, that allows the user to select content to share such as a content file 320.

The user may select the content file 320 using a pointer 330, a finger or stylus on a touch-sensitive interface, or any other method and indicate that the user wishes to share the content file 320. This may be done by, for example, right clicking or otherwise selecting the content file 320 and selecting an option to share the content in a drop-down menu. According to one aspect, the user may indicate a desire to share the content file 320 by beginning to dragging the content file 320. The sending device may detect that the user is dragging a file of a particular type or dragging a file to a particular location in the user interface 300 and determine that the user wishes to share the content file 320.

In response to determining that the user wishes to share the content file 320, the sending device may generate a request to share content that includes characteristics of the content file 320 (e.g., file size, file format, content type, viewing preferences, etc.) as well as location information for the sending device. The sending device may then transmit the request to the system 200.

After receiving a request, the device selection module 215 may identify receiving devices 110 that are within a proximity threshold of the sending device 105 and are capable of loading the content that the user wishes to share. A list of the identified receiving devices 110 may be transmitted back to the sending device 105 to be presented to the user and the user may select one or more of the receiving devices 110 to load the content.

Figure 3B:
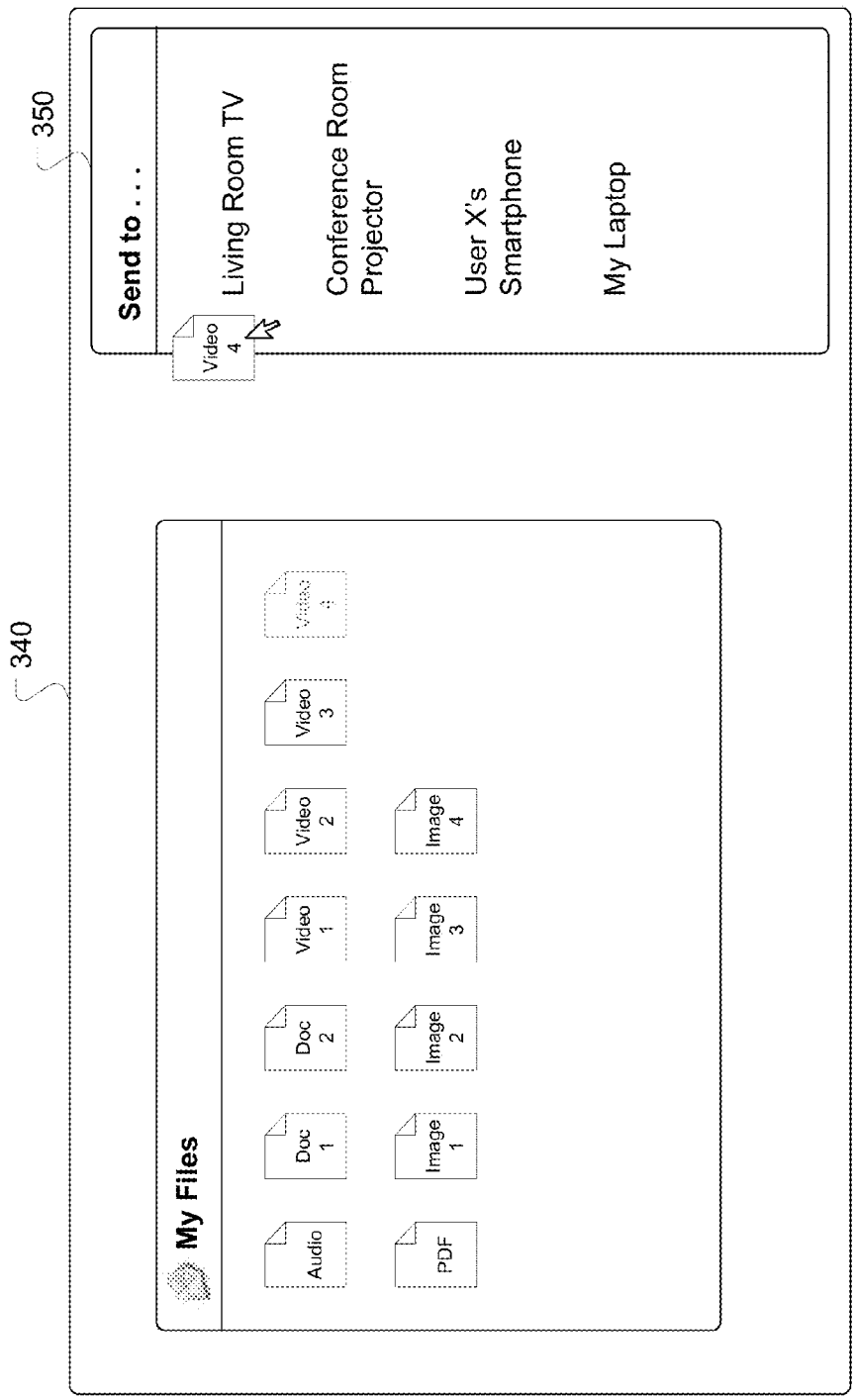
FIG. 3B illustrates an example user interface in which a user of a sending device may select a receiving device to share content with, in accordance with one aspect of the subject technology.

For example, FIG. 3B illustrates an example user interface 340 in which a user of a sending device may select a receiving device to share content with, in accordance with one aspect of the subject technology. As discussed above, the device selection module 215 may receive from the system 200 a list of receiving devices 110 that are nearby and that are capable of loading the content that the user wishes to share.

The user interface 340 may include an interface element 350 that shows the receiving devices 110 and allows the user to select one or more receiving devices 110 to load the content. The user may select a receiving device 110 by, for example, selecting the receiving device using a mouse pointer, a finger, a stylus, or any other method. In one aspect, the user may drag the selected content file to the listing of the desired receiving device displayed in the interface element 350. For example, in FIG. 3B, the user is shown dragging the content file to the "Living Room TV" receiving device.

After the user makes a selection of the one or more receiving devices 110, the sending device 105 may send an indication of the selection and the content to be shared to the system 200. The transmission module 220 may receive the content from the sending device 105 and transmit the content to the one or more selected receiving devices 110. Once received at a receiving device 110, the receiving device 110 may automatically load the content.

According to one aspect, by having a receiving device automatically load the content, the system enables a quick and convenient way for the user to share content across devices. For example, a user may use the system to play a video stored on the user's smart phone at a nearby television display in an easy and intuitive manner (e.g., by dragging the video file to the "Living Room TV" in interface element 350 in FIG. 3B). Furthermore, by sharing the content through the system, the system allows devices on different sub-networks to share content.

Figure 4:
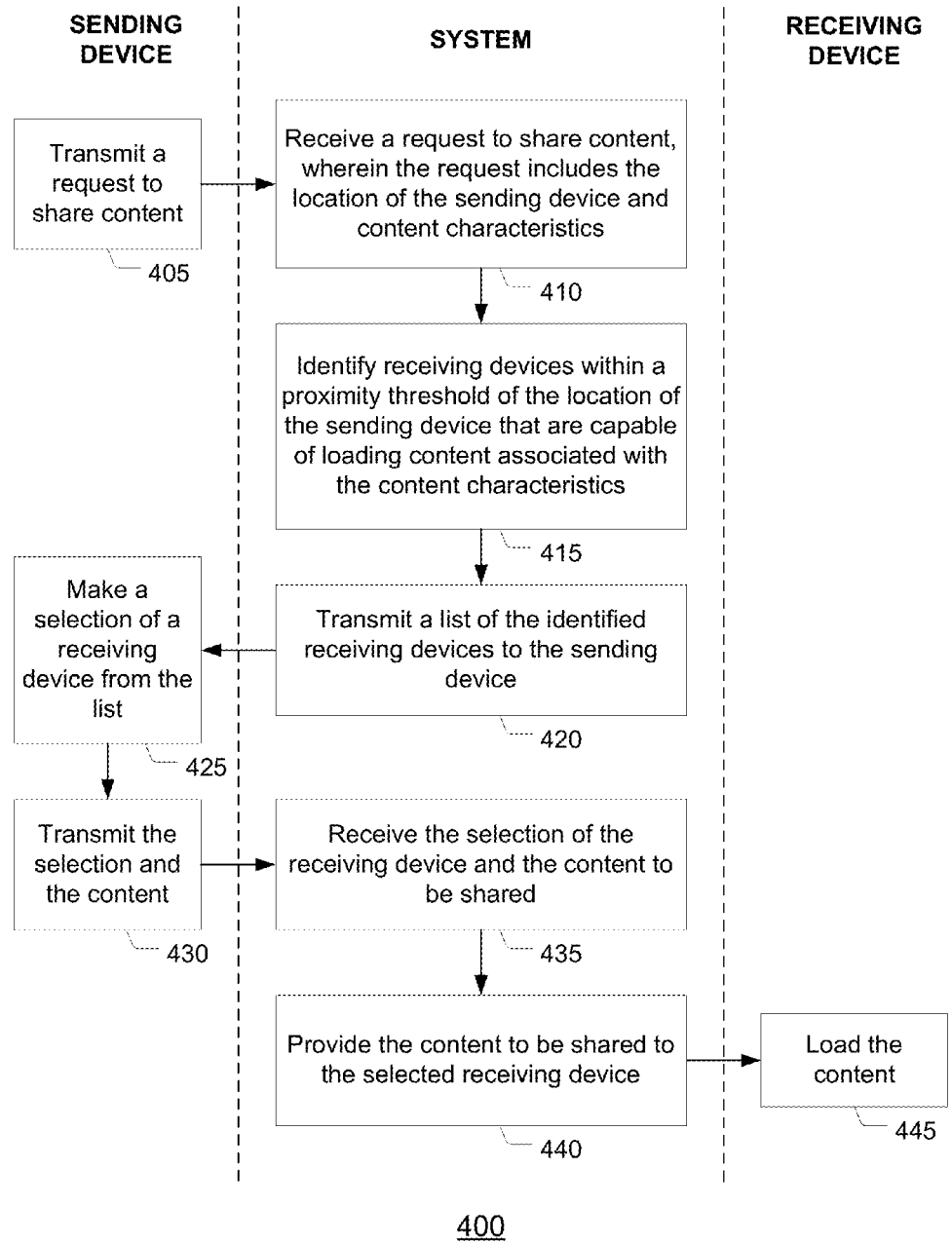
FIG. 4 is a flow chart illustrating an example process 400 for sharing content with nearby devices, in accordance with various aspects of the subject technology.

FIG. 4 is a flow chart illustrating an example process 400 for sharing content with nearby devices, in accordance with various aspects of the subject technology. Although the steps in process 400 are shown in a particular order, certain steps may be performed in different orders or at the same time. In addition, although the process steps of FIG. 4 are described with reference to the components of the system 200 in FIG. 2 and the entities in FIG. 1, the steps are not limited to being performed these components.

At step 405, a sending device transmits a request to share content to the system. As discussed above, the sending device may generate and transmit the request to the system in response to a user selection of a content file and indication that the user wishes to share the content file with a receiving device. In some cases, the selection of the content file and the indication that the user wishes to share the content file may come in the form of a user gesture (e.g., dragging a content file).

The request to share content may include the location of the sending device (e.g., location coordinates, detected Wi-Fi network, or any other location information for the sending device) as well as characteristics of the content to be shared. The characteristics of the content may include, for example, the type of content (e.g., audio, video, images, documents), the file formats for the content (e.g., file extensions for one or more files of the content to be shared), the size of the content, or any other information associated with the content.

According to some aspects, sending devices may also be registered with the system and the system may store location information in records for the sending devices. Accordingly, in one aspect, the request to share content may not include location information for the sending device.

The system receives the request to share content at step 410 and, in response to receiving the request, the device selection module 215 may identify registered receiving devices that are within a proximity threshold of the location of the sending device that are capable of loading the content (see step 415). The device selection module 215 may identify receiving devices based on the content characteristics and the location of the sending device as well as information for registered receiving devices. For example, each registered receiving device may have a corresponding record that includes, for example, location information for the receiving device, a name for the receiving device, types of content the receiving device may load, file formats that the receiving device may handle, or any other characteristics of the receiving device.

The device selection module 215 may identify whether a receiving device is located within a proximity threshold of the sending device based on the location information in the record for the receiving device and the location information for the sending device obtained from the request to share content. In some aspects, the proximity threshold is an estimated distance (e.g., 50 feet). In other aspects, however, the proximity threshold may be a percentage of detected Wi-Fi networks that the sending device and the receiving device share in common or any other measure of proximity.

The device selection module 215 may identify whether a receiving device is capable of loading the content to be shared based on, for example, the information in the record for the receiving device that relates to the types of content that the receiving device may load or file formats that the receiving device may handle, as well as the content characteristics obtained from the request to share content. In some aspects, the identified receiving devices will be receiving devices that are capable of handling content corresponding to the characteristics for the content to be shared.

In another aspect, the transmission module 220 may further be configured to convert content from a sending device from one format to another, based on the capabilities of the receiving device. Accordingly, the device selection module 215 may also identify the receiving devices capable of loading content converted by the transmission module 220.

As an illustrative example, suppose the content to be shared is in "format1" and one particular receiving device can only load content in "format2." However, the transmission module 220 is capable of converting content in "format1" to "format2." Accordingly, the receiving device may be identified as being capable of loading the content to be shared because the transmission module 220 is able to convert the content into a format that is loadable by the receiving device.

Referring back to FIG. 4, once the receiving devices that are within the proximity threshold and are capable of loading the content are identified, the list of identified receiving devices may be transmitted to the sending device at step 420. At step 425, the list may be presented on the sending device to the user and the user may select one of the receiving devices to load the content. This selection, as well as the content, may then be transmitted back to the system at step 430. The selection and the content may be transmitted in a single communication or in separate communications. Furthermore, the selection and the content may be sent at different times during the process 400 (e.g., the content may have been sent to the system at an earlier time in process 400).

At step 435, the system receives the selection of the receiving device and the content to be shared and provides the content to the selected receiving device at step 440. As discussed above, in some aspects, the system may first convert the content into a format that the selected receiving device is capable of loading before sending the content to the receiving device. Furthermore, the content may be sent to the receiving device via a different network or sub-network than the one the system uses to communicate with the sending device. For example, the sending device may communicate with the system using a cellular network and the system may communicate with the receiving device using a local area network linked to the internet.

When the content is received at the selected receiving device, the receiving device may automatically load the content at step 445. According to one aspect of the subject technology, the receiving device may load the content as it is received from the system (e.g., stream the content). In other aspects, however, the receiving device may wait until the content has been received completely to load the content.

Loading content may include various actions based on the characteristics of the content. If more than one action is appropriate for certain content, a default loading action may be used or other loading actions may be selected. For example, for video or audio content, the default loading action for the content may consist of playing the video content; the default loading action for images or other documents may be viewing the content; or the default loading action for documents or spreadsheets may be opening the content for editing.

According to some aspect, during registration, each receiving device may authorize particular loading actions and may specify certain loading actions to be taken based on the type of content. In other aspects, a user on a sending device may select the loading action to be taken for the content to be shared when the request to share content is sent to the system.

According to some aspects, content on a sending device may also be shared with a receiving device based on at least the receiving device being registered with the system. For example, a receiving device may be registered with the system and be associated with a user account. The user may log on to their user account on a sending device and share content with the receiving device, whether or not the sending device and the receiving device are near each other.

Various examples of using location information for devices have been described, such as using global positioning system (GPS) coordinates. However, one or more other technologies can be used in addition to or instead of GPS to determine location coordinates representing a geographic location. For example, location information may be obtained by identifying one or more cell towers that a mobile device may detect or detecting one or more wireless networks with known locations within range of the mobile device. Thus, it should be understood that location information may be used to determine the location of one or more devices as discussed herein to regardless of the technology or technologies used to determine the location coordinates.

Regardless of how location information is obtained, appropriate efforts may also be taken to protect user privacy rights. For example, the collection of location information may be on an opt-in basis so that data is not collected unless the user has granted permission, with the location data stored and handled in a secure manner. Additionally, steps can be taken to anonymize the location data (e.g., to ensure that the location data cannot be tied to a particular user and/or to a particular device).

Figure 5:
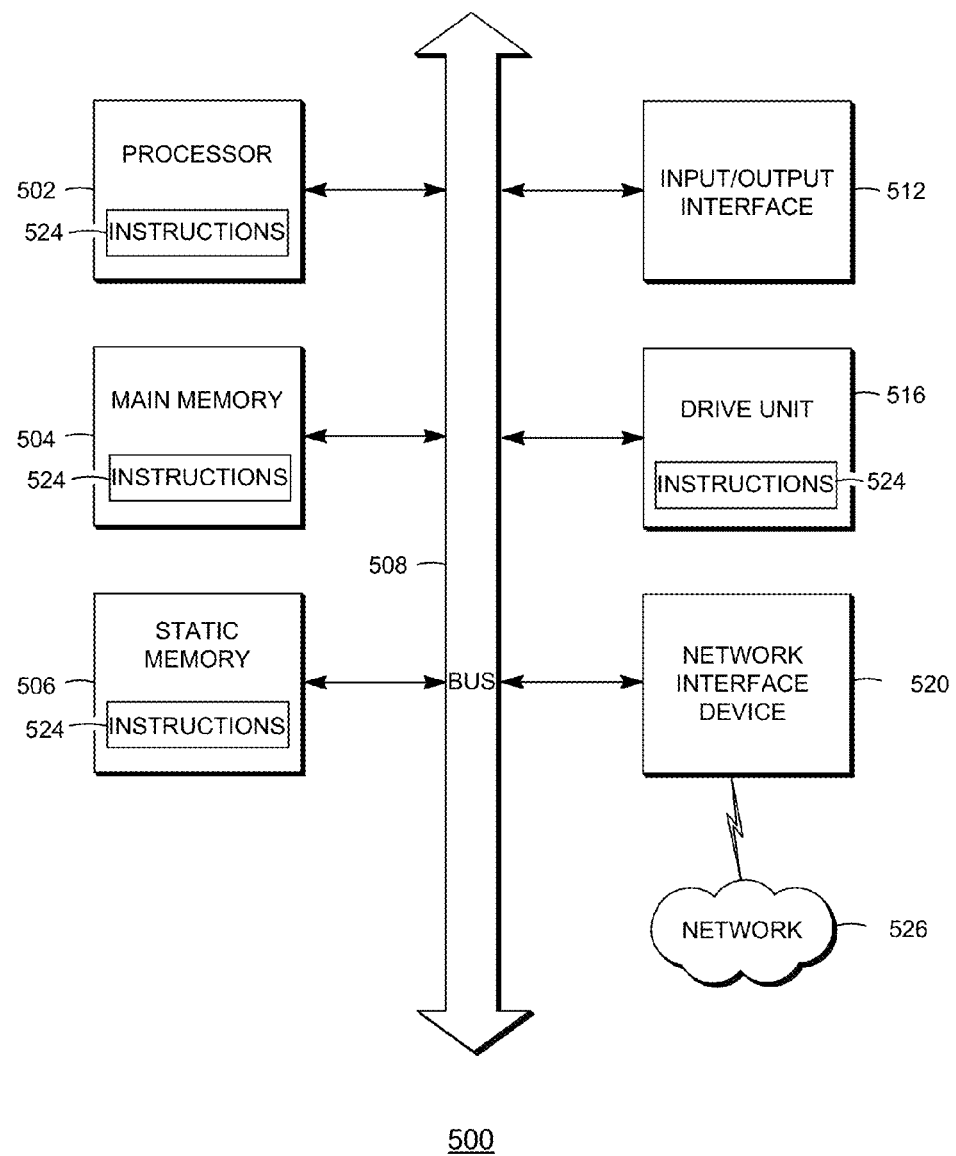
FIG. 5 is a block diagram illustrating an example computer system with which any of the devices, servers, or systems discussed herein may be implemented, in accordance with one aspect of the subject technology.

FIG. 5 is a block diagram illustrating an example computer system 500 with which any of the devices, servers, or systems discussed herein may be implemented, in accordance with one aspect of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for sharing content with a nearby device, the method comprising:
   receiving, from each receiving device of a plurality of receiving devices, a registration of an authorization to load content having one or more predetermined content characteristics onto the receiving device from another device, the one or more predetermined content characteristics comprising a file format, the authorization to load content comprising an authorized action associated with the one or more predetermined content characteristics of the content;
   receiving, from a sending device, a request to share content, wherein the request comprises location information associated with the sending device, content characteristics of the content to be shared, and a respective action to be performed for the content to be shared, the location information indicating a list of detected networks associated with the sending device;
   determining that at least one receiving device of the plurality of receiving devices is within a proximity threshold of the sending device based on location information, and that the at least one receiving device of the plurality of receiving devices previously registered an authorization to load content having the content characteristics of the content to be shared, and an authorization to perform the respective action of the request to share content, the proximity threshold comprising a percentage of networks from the list of detected networks that the sending device and the at least one receiving device share in common;
   receiving, from the sending device, a selection of a receiving device from the at least one receiving device of the plurality of receiving devices and the content to be shared; and
   providing the content to be shared to the selected receiving device.

2. The computer-implemented method of claim 1, wherein the request to share content is generated by the sending device in response to a user gesture.

3. The computer-implemented method of claim 2, wherein the user gesture comprises a dragging gesture of a file associated with the content to be shared.

4. The computer-implemented method of claim 1, wherein the plurality of receiving devices are configured to load the content when the content is convertible into a file format that is loadable by the plurality of receiving devices.

5. The computer-implemented method of claim 1, further comprising converting the content to be shared into a file format that is loadable by the selected receiving device.

6. The computer-implemented method of claim 1, wherein the content is automatically loaded by the selected receiving device.

7. The computer-implemented method of claim 6, wherein the content to be shared is a video file, and wherein the respective action of the request to share content comprises playing the video file.

8. The computer-implemented method of claim 1, wherein the content is received from the sending device in a separate communication from the selection of the receiving device.

9. The computer-implemented method of claim 1, further comprising generating a record for each receiving device of the plurality of receiving devices during a registration process.

10. The computer-implemented method of claim 1, wherein the sending device and the selected receiving device are on different sub-networks.

11. The computer-implemented method of claim 1, wherein the request comprises the list of detected networks associated with the sending device, the sending device.

12. A system for sharing content with a nearby device, the system comprising:
- one or more processors; and
- a machine-readable medium comprising instructions stored therein, which when executed by the one or more processors, cause the one or more processors to perform operations comprising:
    - receiving, from each receiving device of a plurality of receiving devices, a registration of an authorization to load content having one or more predetermined content characteristics onto the receiving device from another device, the one or more predetermined content characteristics comprising a file format, the authorization to load content comprising an authorized action associated with the one or more predetermined content characteristics of the content;
    - receiving, from a sending device, a request to share content, wherein the request comprises location information associated with the sending device, content characteristics of the content to be shared, and a respective action to be performed for the content to be shared, the location information indicating a list of detected networks associated with the sending device;
    - identifying receiving devices based on location information and the content characteristics of the content to be shared, wherein at least one receiving device of the identified receiving devices is within a proximity threshold of the sending device, and that the at least one receiving device previously registered an authorization to load content having the content characteristics of the content to be shared, and an authorization to perform the respective action of the request to share content, the proximity threshold comprising a percentage of networks from the list of detected networks that the sending device and the at least one receiving device share in common;
    - receiving, from the sending device, a selection of a receiving device from the at least one receiving device of the identified receiving devices and the content to be shared; and
    - transmitting the content to be shared to the selected receiving device.

13. The system of claim 12, wherein the request to share content is generated by the sending device in response to a user gesture.

14. The system of claim 12, wherein the operations further comprise converting the content to be shared into a file format that is loadable by the selected receiving device.

15. The system of claim 12, wherein the content is received from the sending device in a separate communication from the selection of the receiving device.

16. The system of claim 12, further comprising generating a record for each receiving device of the plurality of receiving devices during a registration process.

17. The system of claim 12, wherein the request to share content is received from the sending device via a first sub-network, wherein the content to be shared is transmitted to the selected receiving device via a second sub-network.

18. A non-transitory machine-readable medium comprising instructions stored therein, which when executed by a machine, cause the machine to perform operations comprising:
- receiving, from each receiving device of a plurality of receiving devices, a registration of an authorization to load content having one or more predetermined content characteristics onto the receiving device from another device, the one or more predetermined content characteristics comprising a file format, the authorization to load content comprising an authorized action associated with the one or more predetermined content characteristics of the content;
- receiving, from a sending device, a request to share content, wherein the request comprises location information associated with the sending device, content characteristics of the content to be shared, and a respective action to be performed for the content to be shared, the location information indicating a list of detected networks associated with the sending device;
- determining that at least one receiving device of the plurality of receiving devices is within a proximity threshold of the sending device, and that the at least one receiving device of the plurality of receiving devices previously registered an authorization to load content having the content characteristics of the content to be shared, and an authorization to perform the respective action of the request to share content, the proximity threshold comprising a percentage of networks from the list of detected networks that the sending device and the at least one receiving device share in common;
- receiving, from the sending device, a selection of a receiving device from the at least one receiving device of the plurality of receiving devices and the content to be shared; and
- providing the content to be shared to the selected receiving device.

19. The non-transitory machine-readable medium of claim 18, wherein the request to share content is generated by the sending device in response to a user dragging a file associated with the content to be shared.

20. The non-transitory machine-readable medium of claim 18, wherein the plurality of receiving devices are configured to load the content when the content is convertible into a file format that is loadable by the plurality of receiving devices.

* * * * *